UNITED STATES PATENT OFFICE.

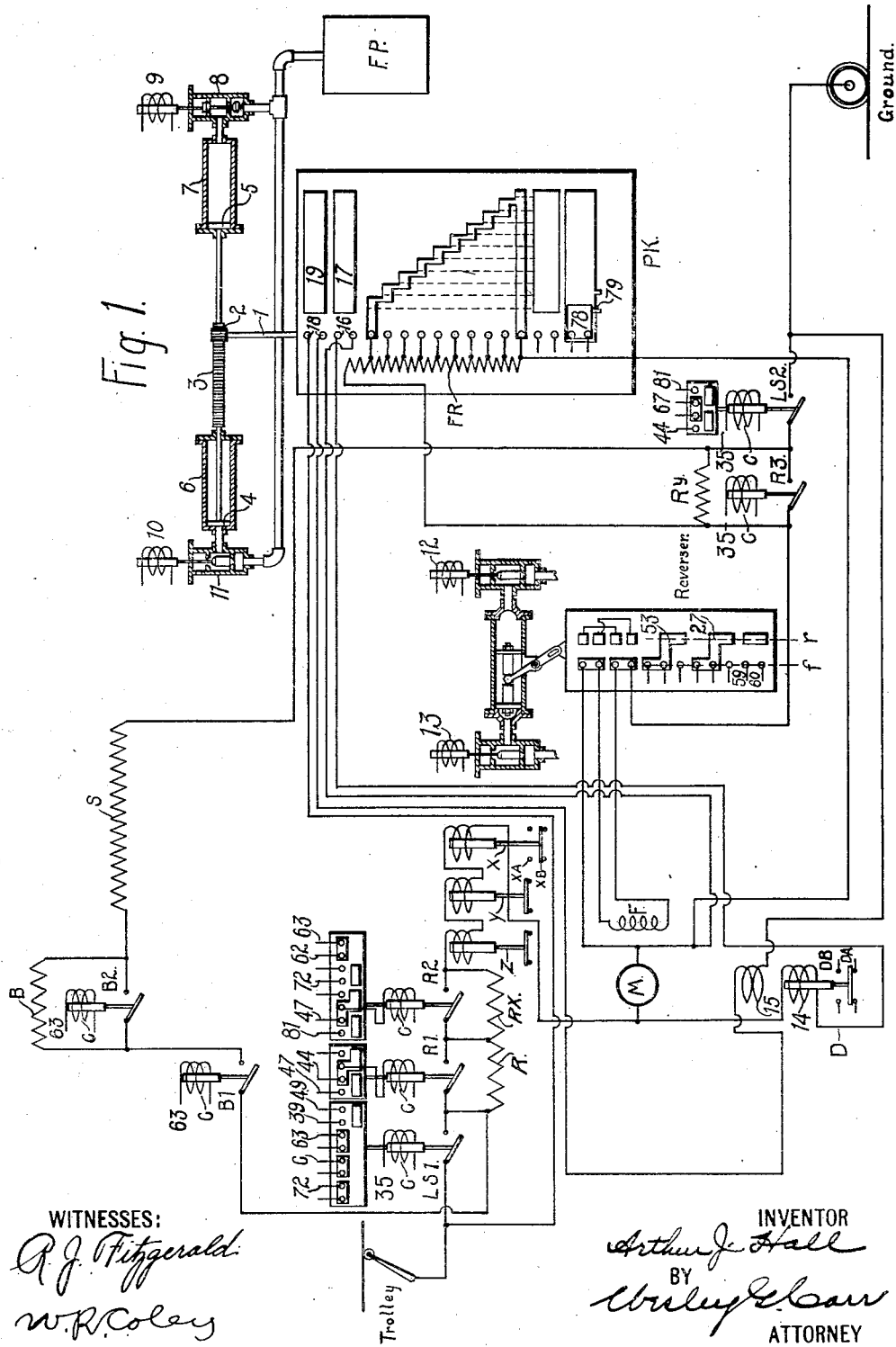

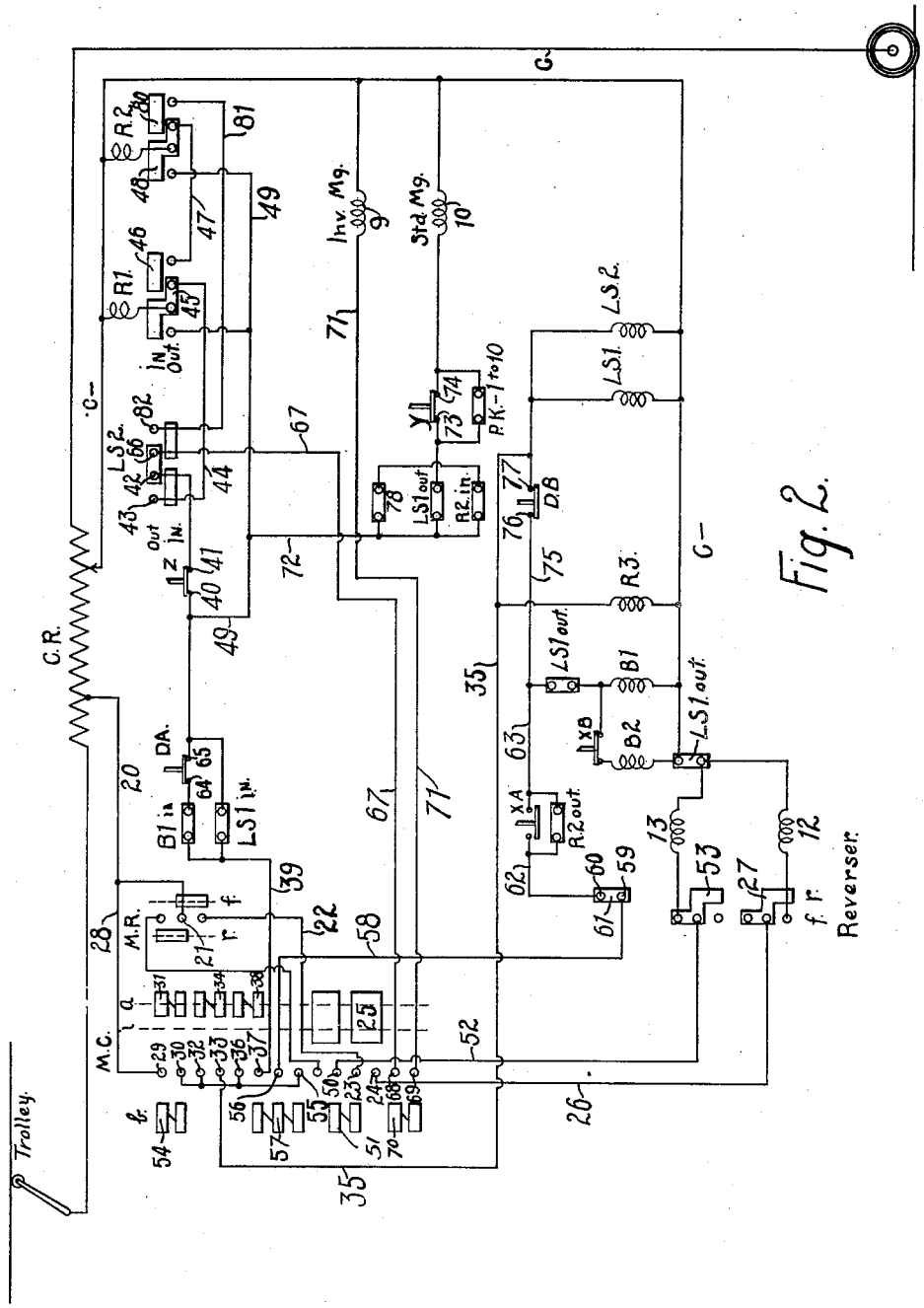

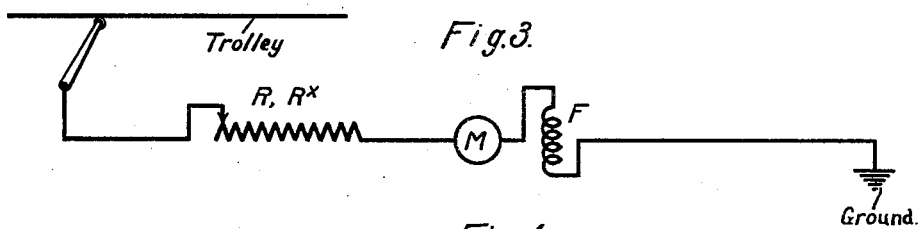
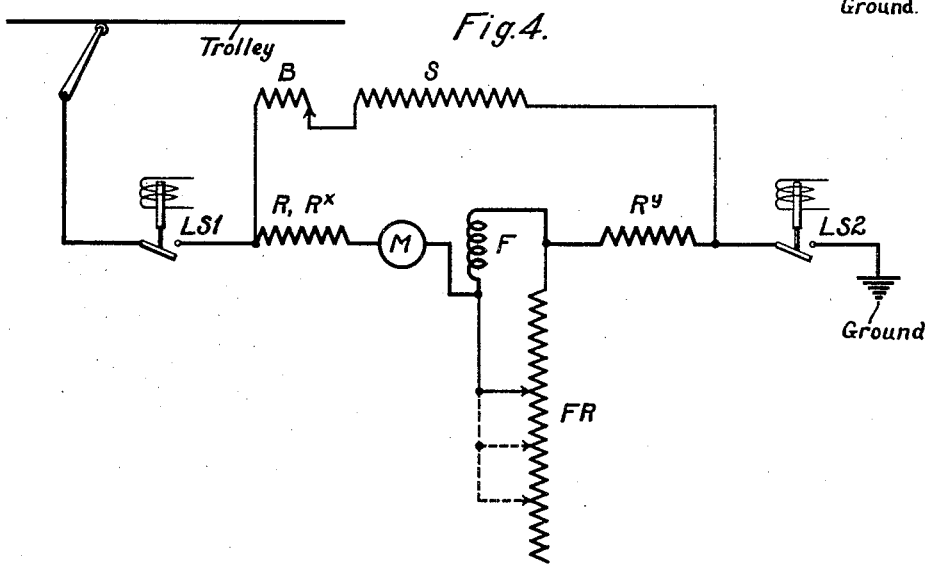
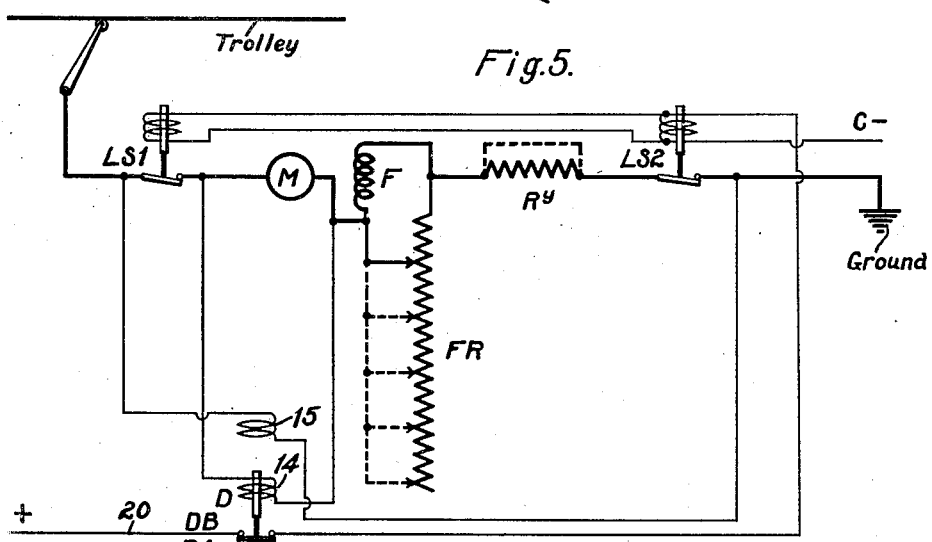

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

REGENERATIVE CONTROL SYSTEM.

1,245,222. Specification of Letters Patent. Patented Nov. 6, 1917.

Application filed February 5, 1914, Serial No. 816,751. Renewed August 3, 1917. Serial No. 184,361.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Regenerative Control Systems, of which the following is a specification.

My invention relates to control systems for electric motors, and it has special reference to such systems as are adapted for use in electric railway service.

One object of my invention is to provide a system of the above-indicated character which shall be adapted for regeneration to the line during speed-reduction periods in order to effect economy in operation and a material reduction in the wear of brake-shoes and wheels.

Another object of my invention is to provide a relatively simple and inexpensive regenerative control system which shall avoid the use of batteries or other auxiliary sources of current supply during the braking periods.

Another object of my invention is to provide automatic means for so regulating the field excitation of the motors during the braking periods as to maintain a substantially constant regenerated current while the motor speed is constantly decreasing.

While my invention is particularly adapted for the control of railway vehicles, it is not limited to any specific class of service but may be utilized in the control of automobiles and other road vehicles or in the control of cranes, hoists and other electrically operated devices.

In the prior art, many regenerative braking systems have entailed the use of storage batteries or other independent sources for current, particularly field-current, regulation, during the braking periods, thereby adding to the equipment an element of considerable expense and one that requires great care in maintenance.

It has been observed that the fields of modern railway motors having solid cast steel frames are relatively sluggish: that is, whereas a change in line resistance causes a very sudden change in the armature current, a change in the local field circuit resistance, as employed during regenerative braking, for example, takes effect much more slowly, by reason of the above-mentioned frame construction.

According to my present invention, I provide a regenerative system from which the independent sources of current supply referred to above have been eliminated, their places being effectively taken by a combination of resistors, as hereinafter described. In this way, a simple and effective means is provided for regenerative current regulation.

In order to adapt the system of control to regenerative service and to secure a maximum braking effort without injuring the electric motors or the other apparatus with which the vehicle is equipped, I provide automatic means, in the form of a differential relay switch, for automatically connecting a propelling motor to the supply circuit when the electro-motive force generated at the motor terminals bears a predetermined relation to the supply circuit voltage.

I provide also automatic means for regulating the field excitation of the motor during the period when it is acting as a generator, whereby a substantially constant braking current is delivered to the supply circuit. In addition to the foregoing, I so interlock the various control switches and apparatus of the system as to permit of the normal operation of the motor or motors in accelerating the vehicle, by throwing the master controller in one direction, and of automatic adjustment of the circuits for regenerative braking accompanied by connection of the motor or motors to the circuit at the proper time, by operating the master controller in the opposite direction.

In the accompanying drawings, Figure 1 is a diagrammatic view of a system of electric motor control embodying my invention, the main circuit connections and the switches and control apparatus which are directly associated therewith being shown complete, according to the usual diagrammatic methods of representation. The control circuits are, however, merely indicated by appropriately designed lines to avoid confusion.

Fig. 2 is a diagrammatic view of the control circuits, including the actuating coils and the interlocks which form parts of the main circuit switches and control apparatus shown in Fig. 1. In order to simplify the circuit connections, however, the interlocks which, as shown in Fig. 1, are grouped with the various switches, are distributed and each of them is marked to indicate the switch or control device with which it is associated and by which it is operated.

Fig. 3, Fig. 4 and Fig. 5 are simplified diagrammatic views respectively corresponding to acceleration, preliminary dynamic braking, and subsequent regenerative operation.

It will be understood that, whereas, for convenience and clearness of illustration, I have shown my invention as embodied in a certain simple control system, the application thereof is not so restricted, as the invention may readily be incorporated in various other types of control systems.

Referring to Fig. 1 of the drawings, the system here shown comprises a supply circuit which, for convenience, is marked "Trolley"; a return circuit conductor marked "Ground"; an electric motor having an armature M and a field magnet winding F; a pair of line switches LS1 and LS2; a plurality of resistor sections R, $R^x$ and $R^y$ severally adapted to be short-circuited by suitable switches R1, R2 and R3, the latter being opened only during regeneration, for a purpose hereinafter specified; a field-regulating resistor FR, which is employed for current-regulating purposes during the braking period; a controller PK for governing the field-regulating resistor, a plurality of limit or throttle switches marked Z, Y and X, respectively; shunting resistors S and B that are adapted to be connected across the entire motor by a switch B1 and the latter of which may be short-circuited by a switch B2; a diffenertial relay switch D having coils respectively connected across the motor and across the line; and a motor-reversing switch marked "Reverser."

The operation of the system with reference to the main circuits only will first be discussed and, subsequently, the control circuits by which the desired main circuit changes are accomplished, will be traced.

Assuming that it is desired to accelerate the motor, switches LS1, LS2 and R3 are closed, thereby establishing a circuit from the trolley through line switch LS1, resistor sections R and $R^x$, limit switches Z, Y and X, the armature M, certain contacts of the reverser, the field magnet winding F, and the switches R3 and LS2 to "ground." The motor and the resistor sections R and $R^x$ are thus connected in series across the supply circuit. The simplified connections are shown in Fig. 3.

The resistor sections R and $R^x$ are then successively short-circuited—dependent upon the limit switch Z—as hereinafter described, thus impressing full voltage upon the motor.

In the braking position, which is reached after disconnection of the motor from the line and the opening of all switches, the switch B1 is first closed, thereby closing a local circuit around the motor and through the resistors S, B, R, $R^x$ and $R^y$. After the limit switch X drops to its lower position XB, the switch B2 closes, thereby short-circuiting the resistor B. One section of the field-regulating resistor FR is, at substantially the same time—dependent upon the limit switch Z—connected across the field magnet winding F, and the amount of the resistor is gradually and automatically increased, thus shunting less and less of the field current until predetermined values of regenerated voltage and current are reached, whereupon the differential relay D is raised to connect the motor to the supply circuit by causing the closure of the line switches LS1 and LS2. Simultaneously with the closing of the line switches, the PK controller is moved back a predetermined amount to avert, to a considerable extent, the initial rush of current, and then the resistors R and $R^x$ are successively excluded—again dependent upon the limit switch Z. Also, upon the closing of the line switches, the switches B1 and B2 are deënergized, thereby removing the local braking circuit. It will be noted that the resistor $R^y$ is in circuit throughout the braking period, it being designed and employed to absorb or prevent, in a great measure, surges and fluctuations of voltage. After connection of the motor to the line, the PK controller is again automatically moved—dependent upon the limit switch Z—to gradually shunt less and less of the field current and thereby maintain a substantially constant regenerated current, as the motor speed decreases, until the last position of the PK controller, accompanied by a relatively low motor sped, is reached. Thereafter, the limit switch X and the differential relay drop, and the regenerative circuit is opened. If desired, the air brakes may then be automatically applied, as set forth in a co-pending application of Norman W. Storer, Serial No. 724,068, filed October 5, 1912, and assigned to the Westinghouse Electric and Manufacturing Company.

The PK controller is preferably of the drum type, the drum being shown as developed into a plane, in a well known manner, and as provided with a shaft 1 to which a pinion 2 is secured. The drum is actuated by a rack 3 which meshes with the pinion 2 and is connected, at its respective ends, to pistons 4 and 5 which operate in cylinders 6 and 7. Fluid pressure is admitted from a tank or reservoir FP, through an electro-magnetically controlled valve 8, to the cylinder 7, when an actuating coil 9 for the valve 8 is deënergized, and fluid pressure is admitted from the tank or reservoir to the cylinder 6 when an actuating coil 10 for the valve 11 is energized.

The arrangement of parts is such that, if both magnet valves are deënergized, fluid pressure will be admitted through the valve 8 to the cylinder 7 and will so actuate the piston 5 and the rack 3 as to move the PK drum to its "off" position.

If the valve magnet 10 is energized, fluid pressure will be admitted to the cylinder 6, but no motion of the drum will result, inasmuch as the pressures are then balanced on the two sides of the piston member. A motion of the drum may, however, be produced by subsequently energizing the coil 9 of the valve 8, since by this means, the valve 8 will cut off the supply of pressure from the reservoir and will open the exhaust port valve. The drum may be stopped at any position by merely deënergizing the coil 9, and it may be returned to its off position by merely deënergizing both of the coils 9 and 10.

The magnet 10, which, when energized, opens the valve 11 to admit fluid pressure to the cylinder 6 and, when deënergized, permits it to close to exhaust air from the cylinder will hereinafter be referred to as a "standard" valve magnet, while the magnet 9 which permits the valve 8 to open to admit fluid pressure to the cylinder 7 when deënergized, and causes it to exhaust the air from the cylinder when energized, will hereinafter be referred to as an "inverted" valve magnet.

The "reverser" may be of any suitable type, but preferably comprises a drum section which is adapted to occupy two positions, one for forward and the other for reverse operation of the vehicle. It is preferably pneumatically operated, and is controlled by valves having actuating coils 12 and 13.

The limit switches Z and Y are raised, when energized above predetermined values, to break certain circuits hereinafter specified, and the limit switch X is adapted to complete a certain control circuit, when occupying its lower position, and to break that circuit and make another upon being raised to its upper position, when energized above a predetermined current value.

The differential relay switch D is provided with a coil 14 which, when energized, tends to raise the switch, and a coil 15 which tends to hold the switch down.

The coil 14 is connected in shunt relation to the armature M when the PK drum occupies any operative, or "on" position, of which, for illustrative purposes, I have shown eight, by reason of the engagement of contact fingers 16 with a contact member 17.

The coil 15 is similarly connected across the supply circuit when the PK drum occupies positions 1 to 10, inclusive, by reason of the engagement of contact fingers 18 with a contact member 19.

The other switches of the system are preferably of a familiar electrically-controlled, pneumatically-actuated type, but any other suitable switches may be employed, if desired.

Reference may now be had to Fig. 2 of the drawings, in which the control circuits shown are governed by a master controller MC adapted to occupy an "off" position, an initial position $i$, an accelerating position $a$, and a braking position $b$, and a master reverser MR adapted to occupy a forward position $f$, and a reversing position $r$.

Energy may be supplied to the control circuits from any suitable source, such as a portion of a control resistor CR which is connected across the line. It will be understood that other sources, such as batteries, may be readily utilized, if desired.

Assuming that the master controller is moved from its "off" position to its initial position $i$, that the master reverser has been thrown into position $f$, and the main reverser occupies the reversing position $r$, a control circuit is first established from the control resistor CR, through conductor 20, a contact finger 21 of the master reverser, conductor 22, control fingers 23 and 24—which are bridged by a contact member 25 of the master controller—conductor 26 to a contact member 27 on the main reverser, the forward coil 12 thereof, and an interlock marked "LS1—out" to the negative control conductor C. Thus, the reverser is thrown to position $f$, in which it is shown. Upon actuation of the master controller to position $a$, a circuit is established from the conductor 20 through conductor 28, control fingers 29 and 30—which are bridged by a contact member 31 of the master controller—control fingers 32 and 33—which are bridged by a contact member 34—conductor 35, and the coils of switches R3, LS1 and LS2 to the conductor C—. Thus, these switches are closed to connect the motor in series with the resistors R and R$^x$, as hereinbefore described.

The current then traversing the motor circuit is sufficient to raise the limit switches in a well-known manner. As soon as the limit switch Z is again closed by reason of the increased speed and counter-electromotive force of the armature, another control circuit is established from energized control fingers 36 and 37—which are bridged by a contact member 38 of the master controller—conductor 39, interlock marked "LS1 in", contact fingers 40 and 41—which are bridged by the limit switch Z—contact fingers 42 and 43—which are bridged by an interlock marked "LS2 in"—conductor 44, contact member 45—that is movable with the switch R1— and the coil of the switch to the conductor C—. Upon the consequent closure of the switch R1, a circuit is completed from the conductor 44 through a contact member 46 of the switch R1, conductor 47, contact member 48 of the switch R2, and the coil of the switch to the conductor C—, thereby closing the switch. Upon the closure of the switches R1 and R2, the coils thereof are automatically transferred, in a well known manner, to a holding circuit, comprising conductors 49 and 39. The motor thus has the full line voltage impressed upon it.

Assuming that the vehicle propelled by the motors is traveling at a suitably high speed and that the master controller is returned to its off position to permit all the switches to open, and is then moved to its braking position; under these conditions, energy is first supplied through conductor 22, control fingers 23 and 50—which are bridged by a contact member 51—conductor 52, contact member 53 of the reverser and through the reversing coil 13 thereof, thereby, independently of the master reverser, throwing the reverser to reverse the relative armature and field magnet winding connections, which reversal, as is well known, is a prerequisite for the regeneration.

As soon as the reverser occupies its reversed position, a circuit is established through the control fingers 29 and 30— which are now bridged by a contact member 54—to control fingers 55 and 56—which are bridged by a contact member 57—conductor 58, contact fingers 59 and 60—which are bridged by a contact member 61 in the reversed position of the reverser—conductor 62, interlock marked "R2 out", conductor 63, interlock marked "LS1 out", and the coil of switch B1 to the conductor C—, thereby connecting the resistors S, B, R, R$^x$ and R$^y$ in a local braking circuit around the motor. (See Fig. 4). When the limit switch X drops, after the initial rush of current, to its lower position XB, it completes a circuit that connects the coil of the switch B2 in parallel with the coil of the switch B1, thus short-circuiting the resistor B. About the same time, a circuit is completed from the energized control fingers 55 and 37—which are also bridged by the contact member 57—through conductor 39, interlock marked "B1 in", contact fingers 64 and 65—which are bridged by the differential relay D in its lower position DA— contact fingers 40 and 41, when the limit switch Z has returned to its lower position to bridge them, contact fingers 42 and 66— which are bridged by interlock marked "LS2 out"—conductor 67, control fingers 68 and 69—which are bridged by a contact member 70 of the master controller—conductor 71 and the inverted valve coil 9 to the conductor C—. Also a circuit is established from the differential relay through conductors 49 and 72, interlock marked "LS1 out", contact fingers 73 and 74—which are bridged by the limit switch Y, when in its lower position—and the standard valve coil 10, to the negative conductor. As hereinbefore explained, the energization of both valve coils causes a step-by-step movement of the PK controller—dependent upon the limit switch Z—as the limit switch Y is bridged by a contact member marked "PK—1 to 10" while the PK drum occupies any "on" position. In the first position of the controller, only the first section of relatively low resistance is shunted across the field magnet winding F, and, in succeeding positions, the resistance is gradually increased to shunt less and less of the field current. When predetermined values of voltage and current are attained, the differential relay D is raised, thereby completing a circuit from the conductor 63, through a conductor 75, contact fingers 76 and 77— which are bridged by the differential relay, when in its upper position DB—and the coils of line switches LS1 and LS2, thus connecting the motor to the line.

Several changes in circuit connections are caused by the closure of the line switches, as illustrated in a simplified manner in Fig. 5. One is the opening of the switch B$^1$ by reason of the opening of its control circuit at the interlock marked "LS$^1$ out," thereby removing the local circuit. The other is the deënergization of the standard valve magnet 10 by reason of the opening of its control circuit at another interlock marked "LS$^1$ out," and the deënergization of the inverted valve magnet 9 by reason of the opening of its control circuit at the contact finger 66, thus actuating the PK controller back toward its first position by an amount which is predetermined by the point where a contact member 78 closes the gap in the circuit of the standard valve magnet. The contact member 78 is limited in its movement by a stationary stop 79 and is connected to the drum by a friction clutch connection. The arrangement of parts is such that a predetermined backward movement of the drum is produced, irrespective of the position of the drum when the line switches close, except that its backward movement will always stop at position 1, since the contact member 78 is made wide enough to simultaneously cover both the "off" and the first positions. However, as soon as the switch R2 is closed, as hereinafter described, the circuit of the valve magnet 10 is completed through an interlock marked "R2 in" that is disposed in parallel relation with the contact member 78.

The backward movement of the PK drum again reduces the field current just at the time when the motor is connected to the line. The purpose of this action is to avert, to a great extent, the sudden rush of current that would otherwise occur during the first instant of regeneration. Just sufficient field-regulating resistance however, is short-circuited to avoid the difficulty.

Again, upon the closure of the line switches LS1 and LS2, a circuit is successively completed through the coils of the switches R1 and R2—dependent upon the limit switch Z—to short-circuit the corresponding resistors, as described above in connection with acceleration. It will be noted, however, that the resistor $R^y$ remains in circuit for a purpose already specified. When the switch R2 is closed, provided the current has dropped to a value low enough to permit the closing of the limit switch Z, a circuit is established from the conductor 47, through a contact member 80 of the switch R2, conductor 81, contact fingers 82 and 66—which are bridged by an interlock marked "LS2 in"—conductor 67, and thus, through the inverted valve magnet 9. As explained above, a step-by-step movement of the PK controller—dependent upon the limit switch Z—is then brought about, thereby gradually shunting less and less of the field current to maintain a substantially constant regenerated current as the motor speed decreases. Upon the closure of the switch R2, the hereinbefore described circuit of the line switches LS1 and LS2 is broken at the interlock marked "R2 out." However, before that time, the braking current has a sufficiently high value to raise the limit switch X to its upper position XA and maintain it raised, thus bridging the interlock just referred to and serving to maintain the circuit of the coils of the line switches after the interlock has dropped out.

After the last position of the PK controller, followed by a relatively low regenerated current and vehicle speed, the limit switch X and, thereafter, the differential relay will drop out to open the circuits of the coils of line switches LS1 and LS2 and break the regenerative circuit. Immediately, all the closed switches will open also, and the PK valve magnets will both be deenergized to return the PK controller to the "off" position, since the control circuits for these switches and for the controller are interlocked with the line switches through the interlock marked "LS1 in." As above indicated, automatic application of the air brakes may be employed, if desired, when the controller reaches its last position.

Moreover, as soon as the LS1 and R2 switches have opened, a previously traced circuit is established from the conductor 58 through interlocks 61, R2—out and LS1—out to the actuating coil of the switch B1, thereby again establishing a local circuit comprising the resistors S, B, etc., as hereinbefore described. Thus, the braking circuit that was initially closed to inaugurate retardation of the machines automatically again becomes operative at the end of the regenerative period, following the opening of the differential relay D. The braking circuit remains closed until the master controller MC is returned to its "off" position, and thus electrical braking is effective until a relatively low machine speed is attained.

The circuit connections and the arrangement of apparatus herein set forth may, of course, be varied within the spirit and scope of my invention. The invention is, for example, not limited to the single motor system I have shown for simplicity and clearness, but may readily be applied to two, four or other motor equipments wherein series-parallel or other type of control are employed. I, therefore, desire that only such limitations shall be imposed as are indicated in the appended claims.

I claim as my invention:

1. In a system of control, the combination with a supply circuit and an electric motor having an armature and a field magnet winding, of a field-regulating resistor adapted to be connected in parallel with the field magnet winding, a switch for closing a local circuit around the motor, and automatic means for connecting the motor to the supply circuit in order to return energy thereto and to retard the motor when a predetermined voltage relation exists between the motor armature and the supply circuit.

2. In a system of control, the combination with a supply circuit and an electric motor having an armature and a field magnet winding, of a field-regulating resistor which is normally open-circuited when the motor is in operation and is adapted to be connected in parallel with the field magnet winding, means for introducing the field-regulating resistor, a second resistor, means for connecting the latter in a local circuit around the motor, and automatic means for connecting the motor to the supply circuit in order to return energy thereto and to retard the motor when a predetermined voltage relation exists between the motor armature and the supply circuit.

3. In a system of control, the combination with a supply circuit and an electric motor having an armature and a field magnet winding, of a normally open-circuited field-regulating resistor, a second resistor, and automatic means for regulating said first resistor and connecting said second resistor across the motor and connecting the motor to the supply circuit when the voltage generated at the motor terminals exceeds the voltage of the supply circuit.

4. A control system comprising a supply circuit, an electric motor, control means for effecting the acceleration and operation of the motor, a resistor, and other control means for regulating the field excitation of the motor, connecting said resistance across the motor and connecting said motor to the supply circuit in order to return energy thereto.

5. In a system of control, the combination with a supply circuit and an electric motor having an armature and a field magnet winding, of a field-regulating resistor, a second resistor, adapted to be connected across the motor, and a differential relay switch dependent upon a predetermined voltage relation between the supply circuit and the motor armature for connecting the motor to the supply circuit in order to return energy thereto when the motor is operating as a generator.

6. A system of control comprising a supply circuit, an electric motor having an armature and a field magnet winding, means for controlling the acceleration and operation of the motor, a field-regulating resistor, a second resistor, means for controlling the regulating resistor, means for connecting said second resistor across the motor, and a master controller adapted to occupy one series of positions for governing the accelerating and operating control means and another set of positions for governing the control means for the field-regulating resistor and the second resistor.

7. A system of control comprising a supply circuit, an electric motor having an armature and a field magnet winding, a field-regulating resistor, a second resistor, a differential relay switch dependent upon a predetermined relation between the supply circuit voltage and the voltage across the armature terminals, and a master controller adapted to occupy one set of control positions for governing the acceleration and operation of the motor and another set of control positions for effecting the introduction and control of the field-regulating resistor, the connection of said second resistor across the motor, and the connection of the motor to the supply circuit for returning energy thereto, said last named connection being directly dependent upon the differential relay switch.

8. A system of control for braking an electric motor comprising a supply circuit, an electric motor having an armature and a field magnet winding, a variable resistor, a second resistor, means for connecting said variable resistor, in parallel with the field magnet winding, means for regulating the said variable resistor in accordance with the current and electromotive force generated by the motor armature, means for connecting said second resistor across the motor, and means for connecting the motor to the supply circuit when the voltage generated by the motor armature attains a predetermined value.

9. A system of control for braking an electric motor comprising a supply circuit, an electric motor having series-connected armature and field magnet windings, a variable resistor, a second variable resistor, means for connecting said first resistor in parallel with the field magnet winding, means for connecting said second resistor across the motor, means for automatically regulating said first variable resistor in accordance with the current and electromotive force generated by the motor armature, and means for automatically connecting the motor to the supply circuit when said generated electromotive force attains a predetermined value.

10. A system of control for braking an electric motor comprising a supply circuit, an electric motor having an armature and a field magnet winding, a variable resistor, a second variable resistor, means for connecting said first resistor in parallel with the field magnet winding, means for connecting said second resistor across the motor, means for automatically connecting the motor to the supply circuit when the voltage generated by the armature attains a predetermined value, means for regulating said first resistor, and means controlling said regulating means, whereby the current generated by the motor armature is maintained in excess of a predetermined value until the motor speed has diminished below a predetermined value.

11. A system of control for braking an electric motor comprising a motor having an armature and a field magnet winding, a field-regulating resistor, a second resistor adapted to be connected across the motor, a reversing switch for reversing the connections of the motor field magnet winding with respect to the armature, and means for actuating said reverser when the motor is changed to a braking generator, irrespective of the former position of the reverser.

12. A system of control for braking an electric motor comprising a supply circuit, a motor having an armature and a field magnet winding, a field-regulating resistor adapted to be connected in parallel with the field magnet winding, a switch for closing a local circuit around the motor, and means for connecting the motor to the supply circuit to return energy thereto.

13. A system of control for braking an electric motor comprising a supply circuit, a motor having an armature and field magnet winding, a switch for closing a preliminary local circuit around the motor, means for regeneratively connecting the motor to the supply circuit, a field-regulating resistor adapted to be connected in parallel with the field magnet winding, means for opening said local circuit upon connection of the motor to the supply circuit, and means for automatically regulating said second resistor to maintain a substantially constant braking current.

14. In a system of control, the combination with a supply circuit, and an electric motor having an armature and a field magnet winding, of a field-regulating resistor which is normally open-circuited when the motor is operated and is adapted to be connected in parallel with the field magnet winding, means for introducing the field-regulating resistor, a second resistor, means for connecting the latter in a temporary local circuit around the motor, automatic means for connecting the motor to the supply circuit in order to return energy thereto and to retard the motor when a predetermined voltage relation exists between the motor armature and the supply circuit, and means for opening said local circuit upon the completion of said last named connection.

15. In a system of control, the combination with a supply circuit, and an electric motor having an armature and a field magnet winding, of a normally open-circuited field-regulating resistor, a second resistor, and automatic means for regulating said first resistor, temporarily connecting said second resistor across the motor, connecting the motor to the supply circuit when the voltage generated at the motor terminals exceeds the voltage of the supply circuit, and thereafter opening said temporary circuit.

16. A control system comprising a supply circuit, an electric motor, control means for effecting the acceleration and operation of the motor, a resistor, and other control means for regulating the field excitation of the motor by preliminarily connecting said resistor across the motor, regeneratively connecting the motor to the supply circuit, and breaking said preliminary connection.

17. In a system of control, the combination with a supply circuit, and an electric motor having an armature and a field magnet winding, of a field-regulating resistor, a second resistor adapted to be preliminarily connected across the motor, a differential relay switch dependent upon a predetermined voltage relation between the supply circuit and the motor armature for regeneratively connecting the motor to the supply circuit, and means for thereupon breaking said preliminary connection.

18. A system of control for braking an electric motor comprising a supply circuit, an electric motor having series-connected armature and field magnet windings, a variable resistor, a second variable resistor, means for connecting said first resistor in parallel with the field magnet winding, means for preliminarily connecting said second resistor across the motor, means for automatically connecting the motor to the supply circuit when the electromotive force generated by the motor armature attains a predetermined value, means for thereupon breaking said preliminary connection, and means for automatically regulating said variable resistor in accordance with the current and voltage generated by the motor armature.

19. In a system of control, the combination with a supply circuit and a momentum-driven dynamo-electric machine having an armature and a field-magnet winding, of means for closing a local circuit around said machine, automatic means for building up the armature voltage, and automatic means for regeneratively connecting the machine to the supply circuit under predetermined conditions.

20. In a system of control, the combination with a supply circuit and a momentum-driven dynamo-electric machine having an armature and a field-magnet winding, of means for closing a local circuit around said machine, and means for automatically connecting the machine to the supply circuit to return energy thereto when a predetermined voltage relation exists between the machine and the supply circuit.

21. In a system of control, the combination with a supply circuit and a momentum-driven dynamo-electric machine having an armature and a field-magnet winding, of means for closing a local circuit around said machine, automatic means for building up the armature voltage, and means for automatically connecting the machine to the supply circuit to return energy thereto when a predetermined voltage relation exists between the machine and the supply circuit.

22. In a system of control, the combination with a supply circuit, and a momentum-driven dynamo-electric machine having an armature and a field winding, of means for initially including said machine in an independent local circuit, and means dependent upon relative armature-circuit and supply-circuit conditions for automatically connecting the machine to said supply-circuit under relatively high-speed conditions and for reëstablishing said local circuit under subsequent relatively low-speed conditions.

23. In a system of control, the combination with a supply circuit, and a momentum-driven dynamo-electric machine having an armature and a field winding, of a resistor normally disconnected from the machine circuit, means for initially connecting said resistor across the machine, means dependent upon relative armature-circuit and supply-circuit conditions for automatically effecting regenerative operation and disconnecting said resistor, and means for automatically again connecting said resistor across the machine at the end of the regenerative period.

24. In a system of control, the combination with a supply circuit, and a momentum-driven dynamo-electric machine having an armature and a field winding, of a resistor normally disconnected from the machine circuit, means for initially connecting said resistor across the machine, means for automatically building up the machine voltage, relay means actuated to automatically effect the connection of the machine to the supply circuit under predetermined relative voltage conditions of the machine and the supply circuit, means dependent upon said last connection for effecting the disconnection of said resistor, and means dependent upon a reverse operation of said relay means at the end of the regenerative period for again effecting the connection of the resistor across the machine.

In testimony whereof, I have hereunto subscribed my name this 31st day of Jan., 1914.

ARTHUR J. HALL.

Witnesses:
P. L. MARDIS,
B. B. HINES.